United States Patent [19]

Miyaoh et al.

[11] Patent Number: 5,344,165
[45] Date of Patent: Sep. 6, 1994

[54] METAL GASKET HAVING FLUID HOLE SEALING DEVICE WITH DIFFERENT SPRING CONSTANT

[75] Inventors: Yoshio Miyaoh, Tokyo, Japan; Takashi Okano, West Bloomfield, Mich.

[73] Assignee: Ishikawa Gasket Co., Ltd., Tokyo, Japan

[21] Appl. No.: 931,415

[22] Filed: Aug. 24, 1992

Related U.S. Application Data

[63] Continuation of Ser. No. 698,704, May 13, 1991, abandoned.

[51] Int. Cl.$^5$ .............................................. F16J 15/08
[52] U.S. Cl. ........................ 277/235 B; 277/207 R; 277/234; 277/236
[58] Field of Search .................... 277/207 R, 208, 209, 277/233, 234, 235 B, 235 R, 236

[56] References Cited

U.S. PATENT DOCUMENTS

| | | | |
|---|---|---|---|
| 4,721,315 | 1/1988 | Ueta | 277/235 B |
| 4,915,398 | 4/1990 | Kitagawa | 277/235 B X |
| 4,948,153 | 8/1990 | Takahashi et al. | 277/235 B |
| 4,971,338 | 11/1990 | Udagawa | 277/235 B |
| 5,149,110 | 9/1992 | Inamura | 277/235 B |

FOREIGN PATENT DOCUMENTS

| | | | |
|---|---|---|---|
| 0255250 | 11/1986 | Japan | 277/235 B |
| 155375 | 10/1987 | Japan | |

Primary Examiner—William A. Cuchlinski, Jr.
Assistant Examiner—John L. Beres
Attorney, Agent, or Firm—Kanesaka & Takeuchi

[57] ABSTRACT

The metal gasket of the invention is installed in an internal combustion engine. The engine includes at least one cylinder bore, a plurality of bolt holes and at least one fluid hole. The gasket is basically formed of a metal plate and includes holes corresponding to the holes of the engine. The gasket includes a bead for sealing around the fluid hole, to which different tightening pressure is proportionally applied when the gasket is tightened. The bead includes at least one first portion where high tightening pressure is applied, and at least one second portion where moderate tightening pressure is applied. The second portion has spring constant less than that of the first portion. When the gasket is tightened, the bead is compressed according to the tightening pressure applied thereto to thereby properly seal around the fluid hole.

10 Claims, 2 Drawing Sheets

METAL GASKET HAVING FLUID HOLE SEALING DEVICE WITH DIFFERENT SPRING CONSTANT

This application is a continuation of application Ser. No. 698,704, filed May. 13, 1991, now abandoned.

BACKGROUND OF THE INVENTION AND RELATED ART STATEMENT

The present invention relates to a metal gasket with a fluid hole sealing device, to which different tightening pressure is applied when a gasket is tightened.

In an internal combustion engine, there are provided many holes, such as cylinder bores, water holes, oil holes, push rod holes, bolt holes and so on. In these holes, a large combustion force or pressure is created at the cylinder bores, while a moderate force or pressure is applied to the water holes and other holes.

Since the large combustion force is created at the cylinder bores, the bolt holes are arranged to effectively seal around the cylinder bores. The other holes are arranged properly around the cylinder bores. Therefore, areas around the cylinder bores are relatively equally pressurized by the bolts to securely seal around the cylinder bores when the gasket is tightened. However, areas around the other holes are not equally pressurized when the gasket is tightened.

In a cylinder head gasket, in order to provide a strong surface pressure around the cylinder bore when a gasket is tightened, in case a bead is formed around the cylinder bore, a bead for forming a high surface pressure is formed around the cylinder bore. Also, the area around the cylinder bore may be made thicker than an area outside thereof to provide a high compression pressure thereat.

Therefore, when the gasket is installed in the engine and is tightened by the bolts, the cylinder head may be curved such that a portion corresponding to the cylinder bore slightly extends outwardly or upwardly. Therefore, equal surface pressure is not formed at, especially, an area around a water hole near the cylinder bore when the gasket is tightened.

In addition, when an engine is operated, the engine vibrates and is heated at high temperatures. Accordingly, it is liable to leak from other holes.

In view of these problems, there have been proposed many methods. For example, in case a gasket is provided with a bead around a hole to be sealed, a pressure regulation plate or portion is formed adjacent to the bead so that the bead is not completely compressed when the gasket is tightened to thereby prevent creep relaxation of the bead.

In U.S. Pat. No. 4,759,556, a portion away from the bolt is generally weak in surface pressure when the gasket is tightened, so that one bead is separated into two beads at the portion away from the bolt to provide strong surface pressure thereat when the gasket is tightened.

In Japanese Patent Publication (KOKAI) No. 62-155375, a bead is formed around a cylinder bore such that a portion of the bead away from the bolt hole has large spring constant to provide equal surface pressure on the bead when the gasket is tightened.

In the prior art, a part of a bead is formed to provide strong surface pressure when the gasket is tightened. In this case, when the bead is strongly tightened, the bead may be compressed properly. However, in case a strong tightening pressure is not applied, large surface pressure is not formed at the portion away from the bolt. Therefore, leakage may happen at that portion.

Accordingly, one object of the present invention is to provide a metal gasket with a fluid hole sealing device, which can seal properly at a portion where equal tightening pressure is not obtained.

Another object of the invention is to provide a metal gasket as stated above, which can effectively seal around the fluid hole for a long period of time.

A further object of the invention is to provide a metal gasket as stated above, which can be easily and economically manufactured.

Further objects and advantages of the invention will be apparent from the following description of the invention.

SUMMARY OF THE INVENTION

A metal gasket with a fluid hole sealing device of the present invention is installed in an internal combustion engine. The engine includes at least one cylinder bore, a plurality of bolt holes for connecting engine parts and at least one fluid hole, such as a water hole and an oil hole.

The gasket is formed of a first metal plate extending substantially throughout an entire area of the engine and includes first, second and third holes corresponding to the cylinder bore, the bolt holes and the fluid hole of the engine, respectively.

The first metal plate includes a bead around the third hole for sealing around the fluid hole. The bead is provided with at least one first portion where a high tightening pressure is applied when the gasket is tightened, and at least one second portion where a moderate tightening pressure is applied when the gasket is tightened. The second portion has a spring constant less than that of the first portion. Accordingly, when the gasket is compressed by tightening the bolts, an area around the third hole is sealed effectively based on the tightening pressure applied thereto.

In particular, when a gasket is equally tightened, an equal tightening pressure is not applied onto a bead. Namely, the tightening pressure on one bead is different depending on the locations of the bead. A portion near the bolt is strong, but a portion near a cylinder bore is not so strong because the cylinder head slightly bent outwardly due to a cylinder bore sealing device when the gasket is tightened. The other portions are not so strongly compressed.

In the present invention, the first portion of the bead where high tightening pressure is applied is located near the bolt hole or the cylinder bore. The spring constant at the first portion is made high. The spring constant at the second portion where moderate tightening pressure is applied is made less than that at the first portion. As a result, the bead is substantially equally compressed to securely seal around the third hole.

In case the fluid hole is an oil hole situated adjacent to the bolt hole and located at a side away from the cylinder bore, the bead surrounds both the second and third holes. The first portion is located adjacent to the bolt hole, and the second portion is located adjacent to the oil hole. The spring constant between the first and second portions is gradually changed.

In case a substantial portion of the third hole is located inside a portion surrounded by imaginary lines connecting centers of the second holes along an outer periphery of the gasket, the first portion where high tightening pressure is applied faces to the bolt hole, the cylinder bore or both.

Therefore, the portions of the bead near the bolt hole, the cylinder bore or both are made to have strong spring constant. As a result, the bead is substantially equally compressed to seal around the fluid hole.

The spring constant may be regulated by changing height, width or curvature of the bead. Also, the metal plate may be combined with other metal plate to constitute a steel laminate gasket.

DETAILED DESCRIPTION OF PREFERRED EMBODIMENTS

Referring to FIGS. 1-4, a first embodiment A of a metal gasket of the invention is shown. The metal gasket A is a cylinder head gasket and is formed of one metal plate A10.

The metal gasket A includes a plurality of cylinder bores Hc, water holes Hw, Hw1, Hw2, bolt holes Hb1-Hb4 and an oil hole Ho. The bolt holes Hb1-Hb4 are arranged around the cylinder bores Hc to provide tightening pressure around the cylinder bore Hc as equal as possible.

When imaginary lines L connecting between centers of the bolt holes Hb1-Hb4 along the outer periphery of the gasket A are drawn, the water holes Hw are located outside the imaginary lines L. The water hole Hw1 is located substantially inside the imaginary lines L. Namely, a substantial portion or more than half of the water hole Hw1 is located inside the imaginary lines L.

The water hole Hw1 is located near the bolt hole Hb2 and a bead A11 of the cylinder bore Hc as well as inside the imaginary lines L. When the gasket A is tightened, therefore, relatively strong and different tightening pressures are applied to a bead A12 formed around the water hole Hw1. Accordingly, the bead A12 is formed according to the present invention.

Figure 3:
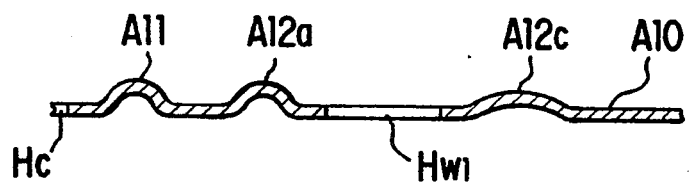
FIG. 3 is an enlarged section view taken along a line 3—3 in FIG. 1.
Figure 4:
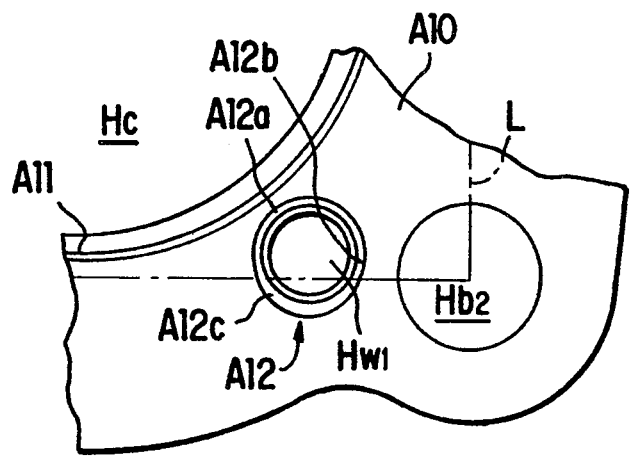
FIG. 4 is an enlarged plan view of a part of the metal gasket for showing a bead around a water hole.

As clearly shown in FIGS. 3 and 4, a portion A12a of the bead A12 is located near the bead A11, and a portion A12b of the bead A12 is located near the bolt hole Hb2. A portion A12c of the bead A12 is located away from the bead A11 and the bolt hole Hb2 and faces an outside of the gasket A.

When the gasket is tightened, since the portion A12b is located near the bolt hole Hb2, high tightening pressure is applied to the portion A12b, while since the portion A12a is located near the bead A11, relatively high tightening pressure is also applied to the portion A12a. On the other hand, the portion A12c does not receive so high tightening pressure when the gasket A is tightened.

In view of the arrangement of the tightening pressure on the bead A12 when the gasket A is tightened, the spring constant of the bead A12 is partly changed. In a cylinder head curved outwardly due to insufficient rigidity of the cylinder head when the gasket is tightened between the cylinder head and the cylinder block, spring constant at the portion A12b is made relatively high, and spring constant at the portion A12a is made stronger than that at the portion A12b, so that at the portion A12a, the relatively high tightening pressure can be applied, by which the portion A12a is compressed. While spring constant at the portion A12c is made moderate, i.e. less than that of the portion A12a, A12b. Spring constant at the bead A11 is made strongest. In this case, the portion A12a is made higher in height (strong in spring constant) than the other portions, so that the portion A12a is compressed equally.

Spring constant may be changed by changing height, width or curvature of a bead. Generally, if height is made lower, width is made wider or curvature is made greater, spring constant becomes small, i.e. a bead can be compressed at relatively lower tightening pressure.

In the bead A12, as shown in FIG. 3, the height of the portion A12a is made substantially the same as that of the bead A11, while the portion A12c is made lower and wider than the portion A12a. The height and width of the portion A12b are between those of the portions A12a, A12c. The height and width of the portions A12a, A12b, A12c gradually change.

When the gasket A is tightened, by insufficient rigidity or distortion of the cylinder head, high tightening pressure is applied to the portion A12b, and relatively high tightening pressure is applied to the portion A12a, while relatively moderate tightening pressure is applied to the portion A12c. However, spring constant at the portion A12b is made lower than that at the portion A12a but higher than that at the portion A12c to apply sufficient tightening pressure to the portion A12a due to insufficient rigidity. Accordingly, the bead A12 around the water hole Hw1 can be substantially equally compressed to be effectively sealed.

Further, since spring constant at the portion A12c is weak, the portion A12c is compressed easily. Therefore, creep relaxation does not substantially occur at the portion A12c, and the portion A12c can be compressed according to the movement of the cylinder head. The bead A12 can seal effectively.

The water holes Hw2 are located inside the imaginary lines L, but the water holes Hw2 are equally spaced apart from the cylinder bores Hc and the bolt hole, respectively. Therefore, substantially equal tightening pressure is applied to portions around the water holes Hw2 when the gasket A is tightened. Accordingly, spring constant is not changed on a bead around the water hole Hw2.

Figure 1:
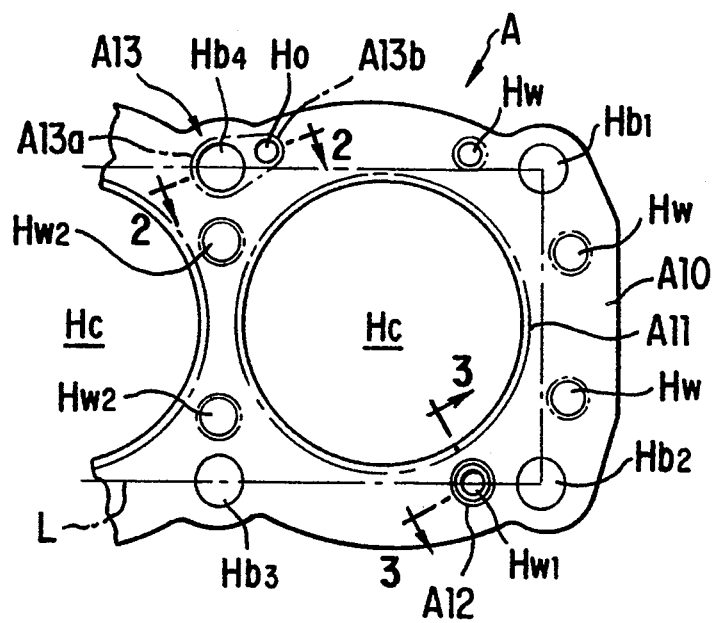
FIG. 1 is a plan view of a part of a metal gasket of a first embodiment of the invention.
Figure 2:
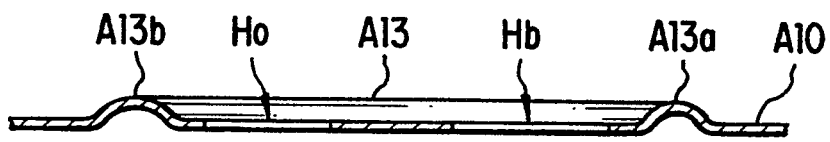
FIG. 2 is an enlarged section view taken along a line 2—2 in FIG. 1.

As shown in FIGS. 1 and 2, the oil hole Ho is situated adjacent to the bolt hole Hb4 and away from the cylinder bore Hc. A cylinder block (not shown) has a bolt hole with a bottom, i.e. the bottom of the bolt hole is closed. Therefore, oil does not leak through the bolt hole at the cylinder block. Accordingly, a bead A13 is formed on the plate A10 to surround both the bolt hole Hb4 and the oil hole Ho.

In this case, a portion A13a of the bead A13 adjacent the bolt hole Hb4 is made narrow in width to have strong spring constant, while a portion A13b adjacent the oil hole Ho is made wide in width to have moderate spring constant. The width of the bead A13 is gradually changed.

In the bead A13, when the gasket A is tightened, the portion A13a near the bolt hole Hb4 is compressed strongly, while the portion A13b near the oil hole is compressed not so strongly. However, spring constant at the portion A13a is made stronger than the portion A13b. As a result, the bead A13 is equally compressed when the gasket A is tightened to thereby securely seal around the oil hole Ho.

Figure 5:
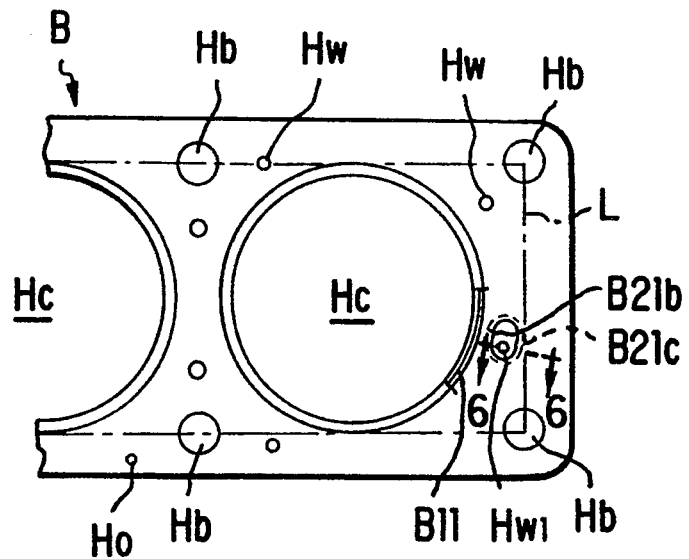
FIG. 5 is a plan view of a part of a steel laminate gasket of a second embodiment of the present invention.
Figure 6:
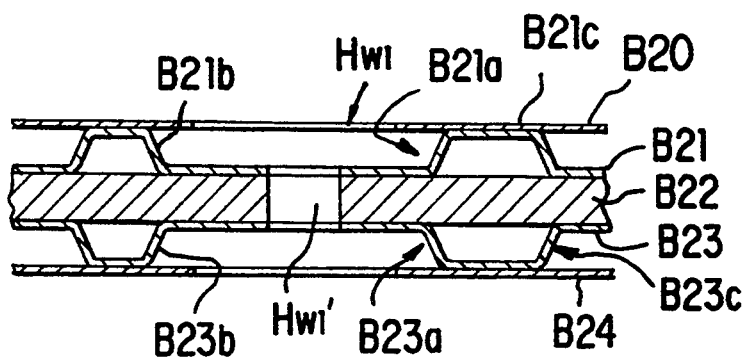
FIG. 6 is an enlarged section view taken along a line 6—6 in FIG. 5.

FIGS. 5 and 6 show a second embodiment B of a metal gasket or steel laminate gasket of the invention.

The gasket B is a cylinder head gasket and includes a plurality of cylinder bores Hc, water holes Hw, Hw1, oil holes Ho and bolt holes Hb. The water hole Hw1 is located near the cylinder bore Hc and inside imaginary lines L connecting between centers of the bolt holes Hb along the outer periphery of the gasket B. Therefore, the water hole Hw1 is sealed according to the present invention.

The gasket B comprises an upper plate B20, middle plates B21, B23, a center plate B22, and a lower plate B24. In the gasket B, flow rate of water passing through the water hole Hw1 is restricted. For this purpose, the center plate B22 and the middle plates B21, B23 have water holes Hw1' smaller than the water hole Hw1. Also, the center plate B22 is made thick to prevent deformation of the plates.

The middle plates B21, B23 have beads B21a, B23a around the water hole Hw1. The beads B21a, B23a include portions B21b, B23b near a bead B11 of the cylinder bore Hc, and portions B21c, B23c at the opposite side of the portions B21b, B23b away from the cylinder bore Hc.

The beads B21a, B23a have flat top portions so that when the beads are compressed, surface pressure is not concentrated at the tops of the beads. The height of the beads B21a, B23a is the same throughout the beads, but the width at the portions B21c, B23c is made wider than that at the portions B21b, B23b. Namely, the portions B21b, B23b facing the cylinder bore Hc are made relatively narrow, while the portions B21c, B23c facing the outer periphery of the gasket are made relatively wide. The width between the narrow and wide portions is gradually changed.

When the gasket B is tightened, the tightening pressure at the portions B21b, B23b is formed stronger than that at the portions B21c, B23c. However, spring constant at the portions B21b, B23b is made stronger than that at the portions B21c, B23c. Accordingly, the beads can be compressed substantially equally though the tightening pressure applied thereto is different. The area around the water hole Hw1 is sealed properly by different tightening pressure.

In the gasket of the present invention, even if tightening pressure is not equally applied to one bead for sealing around a fluid hole, spring constant of the bead is partly changed so that the bead is compressed by the different tightening pressure. Accordingly, the fluid hole can be effectively sealed.

While the invention has been explained with reference to the specific embodiments of the invention, the explanation is illustrative, and the invention is limited only by the appended claims.

What is claimed is:

1. A metal gasket with a fluid hole sealing device for an internal combustion engine, said engine having at least one cylinder bore, a plurality of bolt holes and at least one fluid hole and being formed of a cylinder block and a cylinder head, said cylinder head having a rigidity such that when tightened to the cylinder block, sufficient surface pressure is not applied to portions away from the bolt holes due to distortion of the cylinder head along a rigid portion of the gasket, said gasket comprising:

a first metal plate extending substantially throughout an entire area of the engine and including at least one first hole corresponding to the cylinder bore, a cylinder bore sealing device situated around the first hole, a plurality of second holes corresponding to the bolt holes and at least one third hole corresponding to the fluid hole, and a bead formed on the first metal plate around the third hole for sealing around the same, said bead having at least one first portion where high tightening pressure is applied when the gasket is tightened, said first portion being located adjacent to at least one of the bolt hole and the cylinder bore, and at least one second portion where moderate tightening pressure is applied when the gasket is tightened, said second portion having spring constant less than that of the first portion so that an area around the third hole is sealed effectively and sufficient tightening pressure is applied to the second portion due to insufficient rigidity when the gasket is tightened by the bolts.

2. A metal gasket according to claim 1, wherein said fluid hole is an oil hole situated adjacent to the bolt hole and located at a portion away from the cylinder bore, said bead surrounding both the second hole and the third holes, said first portion being located adjacent to the bolt hole and said second portion being located adjacent to the oil hole.

3. A metal gasket according to claim 2, wherein the spring constant between the first and second portions is gradually changed from the first portion to the second portion.

4. A metal gasket according to claim 3, further comprising at least one second metal plate situated adjacent to the first metal plate for constituting a steel laminate gasket.

5. A metal gasket according to claim 1, wherein a substantial portion of said third hole is located inside a portion surrounded by imaginary lines connecting centers of the second holes along an outer periphery of the gasket.

6. A metal gasket according to claim 5, wherein said first portion of the bead faces at least one of the bolt hole and the cylinder bore, the tightening pressure at the first portion being stronger than that at the second portion when the gasket is tightened.

7. A metal gasket according to claim 6, wherein said cylinder bore sealing device is a bead, spring constant of the bead around the third hole is weaker than spring constant of the bead of the cylinder bore sealing device.

8. A metal gasket according to claim 7, wherein said third hole is a water hole situated adjacent to the cylinder bore.

9. A metal gasket according to claim 8, further comprising at least one second metal plate situated adjacent to the first metal plate for constituting a steel laminate gasket.

10. A metal gasket according to claim 1, wherein said spring constant is regulated by changing at least one of height, width and curvature of the bead.

* * * * *